UNITED STATES PATENT OFFICE.

RENÉ BOHN, OF MANNHEIM, ASSIGNOR TO THE BADISCHE ANILIN AND SODA FABRIK, OF LUDWIGSHAFEN, GERMANY.

BLACK COLORING-MATTER.

SPECIFICATION forming part of Letters Patent No. 546,576, dated September 17, 1895.

Application filed July 3, 1895. Serial No. 554,839. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of New Black Substantive Coloring-Matters, of which the following is a specification.

In the pending applications for Letters Patent, Serial Nos. 525,364 and 525,365, I have described the manufacture of new coloring-matters from dinitro-naphthalene. The said coloring-matters are produced by the action of certain reducing agents upon this dinitro body under conditions described in the said specifications. Thus, by the action of sodium sulfide under different conditions two coloring-matters are obtained, one insoluble and the other soluble in soda solution. These dyes are hereinafter termed "dye B'" and "dye C," respectively. In ordinary manufacture they are usually obtained admixed with one another.

I have discovered that if dye B be heated with caustic soda solution it is converted into a new black coloring-matter. This differs from dye B, which is insoluble in water and practically insoluble in cold caustic alkali, in being very readily soluble in cold alkaline water. The solution of the new coloring-matter possesses the novel and exceedingly valuable property of dyeing unmordanted vegetable fiber directly in the cold, yielding very fast shades. I have also found that the alkaline solution of dye C can also be used in this way. Hence, if a mixture of dye B and dye C be heated with caustic soda solution the resulting mixture can at once be used for dyeing purposes in the cold without the aid of a mordant.

In actual manufacture the production of the dye B, whether alone or in admixture with dye C, and its conversion into the new product can readily be united into one process, in which the final operation is the digestion with caustic alkali hereinbefore mentioned.

The following examples will serve to illustrate the manner in which my invention can best be carried into practical effect; but I do not confine myself to the details given, as the proportions, strength of alkali, and temperatures can be considerably varied without departure from the invention. The parts are by weight.

Example 1: Mix about two hundred parts of dye B in paste (containing about thirty per cent. dye B, either alone or admixed with dye C) and about one hundred parts of caustic soda-lye, (containing about twenty-three per cent. NaOH,) and digest the mixture for about one hour on the boiling-water bath. A blue-violet solution results. This can be used without further treatment for dyeing purposes or the liquid can be evaporated. The dry product constitutes a black powder readily soluble in cold water, giving a blue-violet to black solution. Excess of alkali does not precipitate the dye, but mineral acids give a black precipitate. The dye dissolves in concentrated sulfuric acid, giving a dirty green-colored solution.

The following example describes the preparation of dye B (containing some dye C) from dinitro-naphthalene and the conversion of this mixture into new direct dyeing coloring-matter.

Example 2: Mix together about fifty parts of the 1.1', dinitro-naphthalene (with or without some admixed 1.4' dinitro-naphthalene) and about ten thousand parts of water, boil the mixture, and add about two hundred and fifty parts of sodium-sulfid, ($Na_2S+9Aq$,) boil for about half an hour or until no dinitro-naphthalene remains unchanged; filter; add to the violet solution obtained about five hundred parts of hydrochloric acid, (containing about thirty per cent. real acid,) boil two hours longer, filter and wash; mix the washed residue with sufficient water to produce a thirty per cent. paste, and add to this paste half its weight of caustic soda solution, (containing about twenty-three per cent. NaOH,) and digest the mixture for about one hour on the boiling-water bath, as described in Example 1.

To produce black colorations on cotton with the new coloring-matter or with the alkaline solution of dye C or mixtures thereof the cotton is padded for about half an hour with a cold solution of the coloring-matter taken. The cotton is then washed and dried. A solution of one part of the new dye containing dye C in forty-five parts water gives a dead black on ten parts of cotton stuff. A similar blue-black dyestuff can be obtained by digesting with caustic alkali the violet dye obtained by Troost by treating dinitro-naphthalene with sodium sulfide.

My new coloring-matter usually contains a certain quantity of admixed sulfide of sodium so that on acidifying a smell of sulfuretted hydrogen can be noticed.

Now, what I claim is—

1. As an article of manufacture the new black coloring matter which can be obtained by treating the herein described dyes derived from dinitro-naphthalene and mixtures thereof, with hot caustic soda solution and which occurs as a black powder (or in solution) and is readily soluble in cold water giving a blue violet to black solution, from which excess of alkali throws down no precipitate, but mineral acids yield a black precipitate and which is soluble in concentrated sulfuric acid giving a dirty green colored solution all substantially as described.

2. The process for the production of new black coloring matter which consists in digesting with caustic soda solution the herein described coloring matters obtained by the action of sodium sulfide on dinitro-naphthalene substantially as described.

In testimony whereof I have hereunto set my hand in the presence of two subscribing witnesses.

RENÉ BOHN.

Witnesses:
ERNEST F. EHRHARDT,
ADOLPH RENTLINGER.